Patented Dec. 30, 1924.

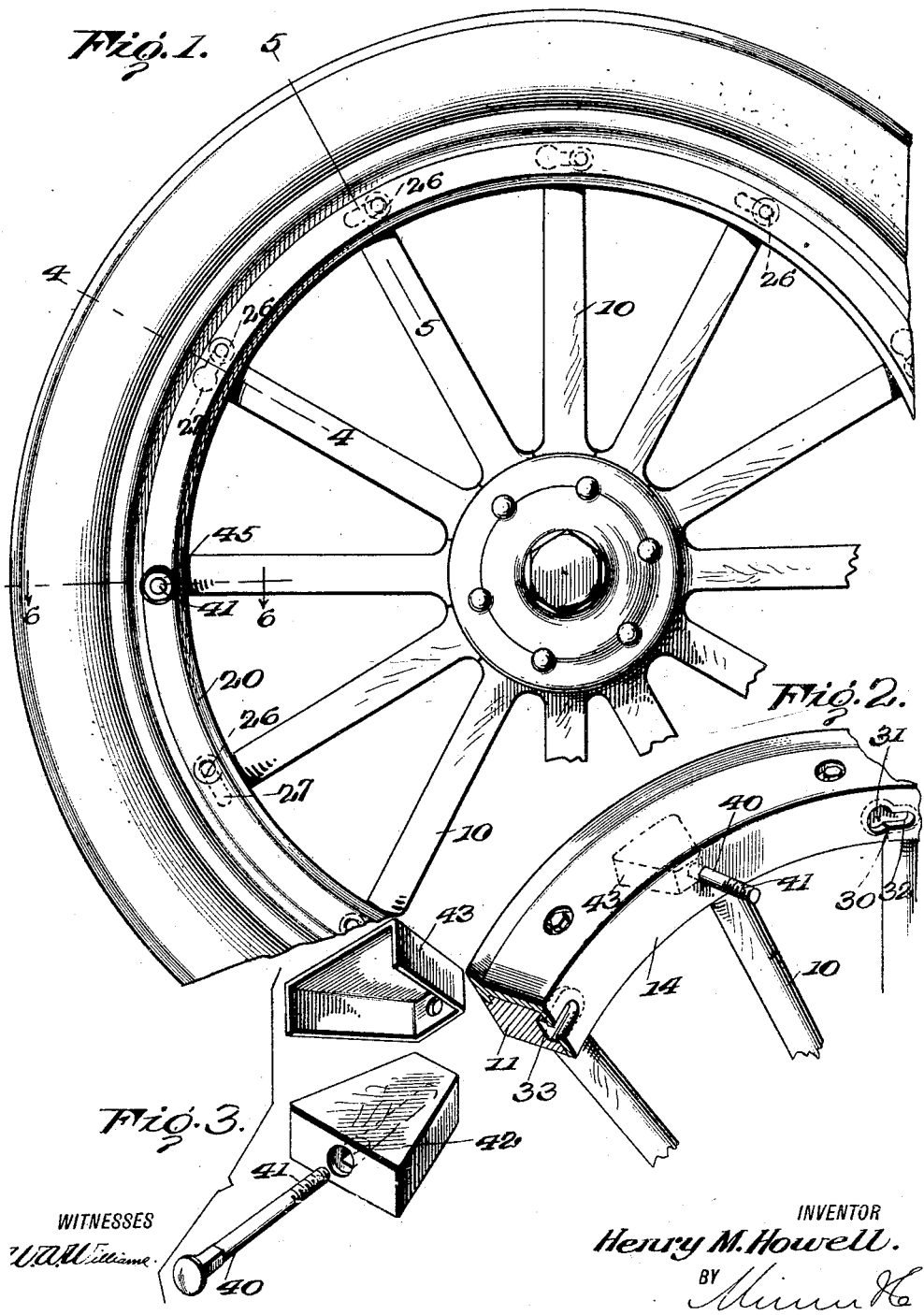

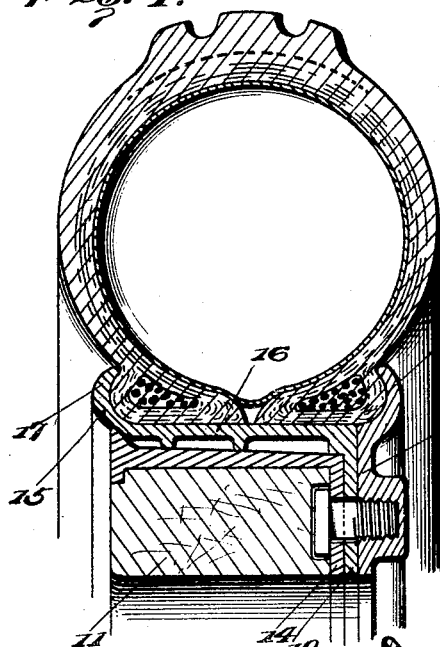

1,521,538

UNITED STATES PATENT OFFICE.

HENRY MARTIN HOWELL, OF MONROE, LOUISIANA, ASSIGNOR OF ONE-HALF TO JOHN EDWARD DOUGHTIE, OF MONROE, LOUISIANA.

WHEEL.

Application filed July 3, 1922. Serial No. 572,497.

*To all whom it may concern:*

Be it known that I, HENRY MARTIN HOWELL, a citizen of the United States, and a resident of Monroe, in the parish of Ouachita and State of Louisiana, have invented certain new and useful Improvements in Wheels, of which the following is a specification.

This invention relates to an improvement in wheels of the type embodying a demountable rim.

The object of the invention is to provide a wheel of this character which is of extremely simple and durable construction, reliable and efficient in operation and easy and comparatively inexpensive to manufacture and wherein the demountable rim may be readily applied to or taken from the wheel and the outer tire retaining flange of the demountable rim may be readily disassociated from the other elements of the rim, the outer tire retaining flange and the demountable rim being at the same time securely locked in proper position in the assembly.

Other objects and advantages of the invention reside in certain novel features of the construction, combination and arrangement of parts which will be hereinafter more fully described and particularly pointed out in the appended claims, reference being had to the accompanying drawings forming part of this specification and in which:

Figure 1 is a fragmentary view in side elevation illustrating one form of wheel embodying my invention;

Figure 2 is a fragmentary perspective view of a portion of wheel, showing the demountable rim removed;

Figure 3 is a group view in perspective illustrating the means employed for anchoring the locking bolt in place;

Figure 4 is a view in transverse section, taken approximately on line 4—4 of Figure 1;

Figure 5 is a similar view, taken approximately on line 5—5 of Figure 1;

Figure 6 is a similar view, taken approximately on line 6—6 of Figure 1;

Figure 7 is a detail view in section of the outer locking plate and its integral tire retaining flange; and Figure 8 is a fragmentary view in perspective showing the construction of the demountable rim.

Referring to the drawings, the numeral 10 designates a wheel shown for the sake of illustration as being of the artillery type but which may be a wire wheel, disk wheel or any other conventional type of wheel. The wheel is constructed so as to include a felly 11, upon which a felly band 12 is secured, the felly band having a circumferential shoulder 13 constituting a seat or abutment for the demountable rim and having an integral locking plate 14 at its outer circumferential edge, the integral locking plate depending from the felly band and being disposed flush up against the outer lateral face of the felly 11. A demountable rim designated generally at 15 is provided and includes a base section 16 and an inner tire retaining flange 17, and an outer tire retaining flange 18. The base section 16 of the demountable rim is provided with a depending locking plate 19 integrally formed with its outer circumferential edge. This locking plate is adapted to lie flush up against the locking plate 14 in the assembly. The outer tire retaining flange 18 also includes a depending locking plate, designated at 20 and which lies flush up against the locking plate 19 in assembly. The locking plate 20 coacts with both the locking plates 14 and 19 in order to serve two functions first to releasably secure the outer tire retaining flange in assembly with the other elements of the demountable rim and second to releasably secure the demountable rim in position on the wheel. For this purpose the locking plate 19 is provided with a plurality of key hole slots 21 arranged at regular spaced intervals around the plate and each including a circular enlarged portion 22 and a contracted slot or opening 23 communicating with the circular enlarged portion. The plate 20 carries a plurality of relatively short headed studs 24 cooperable with the openings or key hole slots 21. The studs each include shanks 25 threaded, welded or otherwise secured to the locking plate 20 at one end and having heads 26 at their opposite ends. In assembling the removable tire retaining flange with the other elements of the rim, the headed studs are introduced through the enlarged openings 22 of the key hole slots and the tire retaining flange is then rotated or moved circumferentially to cause the shanks of the studs to move into the slots 23 or contracted portions of the key hole slots 21, the heads of the studs being engaged with the shoulders presented by the portions of the rim which define the contracted openings 23. As clearly shown in Figures 2 and 5, the locking plate 14 is provided with arcuate slots 27 accommodating the heads 26 of the studs. The locking plate 14 is also provided with a plurality of key hole slots, designated at 30 arranged at regular spaced intervals about the periphery of the plate 14 and include large circular openings 31 and contracted slotted portions 32, the felly being provided with an annular channel 33 beneath the key hole slots. A plurality of relatively long or elongated headed studs 35 are also carried by the locking plate 20 of the outer tire retaining flange. These studs 35 include elongated shanks 36 each having one end secured to the locking plates 20 and having formed at the other end heads 37. When the demountable rim is placed on the wheel and the headed studs 37 are introduced in through the enlarged circular portion 31 of the key hole slots 30 and the demountable rim is then rotated to bring the heads 37 behind the shoulders presented by the plate 14 which defines the contracted portion 32 of the key hole slots.

Suitable means is provided for holding the demountable rim and locking plates against circumferential movement with respect to each other and with respect to the wheel. This means preferably comprises a locking bolt 40 having a threaded shank 41 adapted to be projected laterally from the wheel, the locking bolt being releasably anchored in the block 42 set in a ferrule 43 disposed in a socket provided therefor in the felly 11. It is to be noted of course that the ferrule 43 is first fitted into the recess or socket provided for it in the felly and suitably secured in such position. After the ferrule is assembled with the felly, the felly band is put in place and the block 42 and bolt 40 may be introduced into the cage or ferrule at any time. The locking bolt 40 extends through openings provided for it in the block 42 and locking plates 14, 19 and 20, these openings being in registration when the rim is assembled with the wheel and of course when the tire retaining flange is in locking position. The threaded portion of the shank projects laterally from the locking plate 20 and facilitates the association of the nut 45 thereof, a lock washer 46 being interposed between the nut and the plate if this is desired. The locking bolt 40 is preferably slightly tapered to facilitate its disassociation from the locking plates or blocks 42 in removing the rim from the wheel. Obviously the ferrule 43 may have its bottom closed if desired by a plate similar to the plate which closes the top thereof, and this plate may be provided around its rear or marginal edge with a lateral flange provided with apertures cooperable with screws or other fastening means for securing the ferrule in position, the screw being adapted to be screwed into the ferrule or other adjacent stationary structure.

It is obvious that with this arrangement the assembly and disassembly of the demountable rim with the wheel and the replacement and repair of tires on the demountable rim is greatly facilitated, since in order to carry out any of these operations is is only necessary to remove the nut 45, a single nut. The demountable rim may then be readily taken from the wheel by simply turning it circumferentially with respect to the wheel and then withdrawing it therefrom. Similarly the outer tire retaining flange may be taken from the demountable rim proper by turning it circumferentially with respect to the other elements of the rim. If desired suitable impact lugs may be provided on the outer plates to facilitate the impartation of circumferential movement. In lieu of the impact lugs the locking plates may be provided with diametrically opposite slots cooperable with a wrench or other suitable operating tool.

I claim:

1. In a device of the character described, a two part demountable rim including a base section having a locking plate and a removable tire retaining flange having a locking plate, the locking plate of the base section having key hole slots, headed studs carried by the locking plate of the retaining flange and cooperable with said slots, said locking plate of the retaining flange also carrying relatively longer headed studs adapted to cooperate with key hole slots of a felly.

2. In a device of the character described, a two-part demountable rim including a base section having a locking plate, a tire retaining flange having a locking plate, the locking plate of the base section having key hole slots, a plurality of relatively long studs carried by the locking plate of the retaining flange and adopted to cooperate with recesses in a felly, the locking plate of the base section having arcuate slots accommodating said relatively long studs, and a plurality of relatively short studs carried by the locking plate of the retaining flange and cooperable with the key hole slots of the locking plate of said base section.

HENRY MARTIN HOWELL.